United States Patent [19]

Ferguson et al.

[11] 4,367,563
[45] Jan. 11, 1983

[54] COMBINATION BEE POLLEN TRAP AND HIVE CONTAINMENT APPARATUS

[76] Inventors: William M. Ferguson, P.O. Box 32; Gene R. Howard, Box AH; Charles F. French, Box 313, all of Thatcher, Ariz. 85552

[21] Appl. No.: 258,024

[22] Filed: Apr. 27, 1981

Related U.S. Application Data

[63] Continuation of Ser. No. 64,123, Aug. 6, 1979, abandoned.

[51] Int. Cl.³ .............................................. A01K 47/06
[52] U.S. Cl. ...................................................... 6/4 R
[58] Field of Search ............................. 6/1, 4 R, 12 M

[56] References Cited

U.S. PATENT DOCUMENTS

| | | | |
|---|---|---|---|
| 180,596 | 8/1876 | Jones | 6/4 R |
| 3,343,186 | 9/1967 | Dunand | 6/1 |
| 3,995,338 | 12/1976 | Kauffeld | 6/12 M X |
| 4,291,424 | 9/1981 | Angelis | 6/4 R |

FOREIGN PATENT DOCUMENTS 1223455  6/1960  France ..................................... 6/4 R Primary Examiner—Gene Mancene
Assistant Examiner—Robert P. Swiatek
Attorney, Agent, or Firm—Gregory J. Nelson

[57] ABSTRACT

A combination pollen trap and containment apparatus for attachment to a bee hive having a frame attachable at the opening of the hive. The frame defines a pathway through which the bees must pass to gain entrance to the hive. A pollen collection screen is detachably securable in the pathway and bees entering and leaving the hive are forced to pass through the screen causing pollen pellets to be loosened from the body and legs of the bee. The screen can be easily removed when it is desired to open the hive. A pollen drawer is located below the pollen screen and serves to collect the pollen falls from the bees. A containment screen is also securable in the pathway to retain the bees within the hive. The containment screen has openings to provide for ventilation and permit the beekeeper to feed the bees during periods of confinement.

3 Claims, 16 Drawing Figures

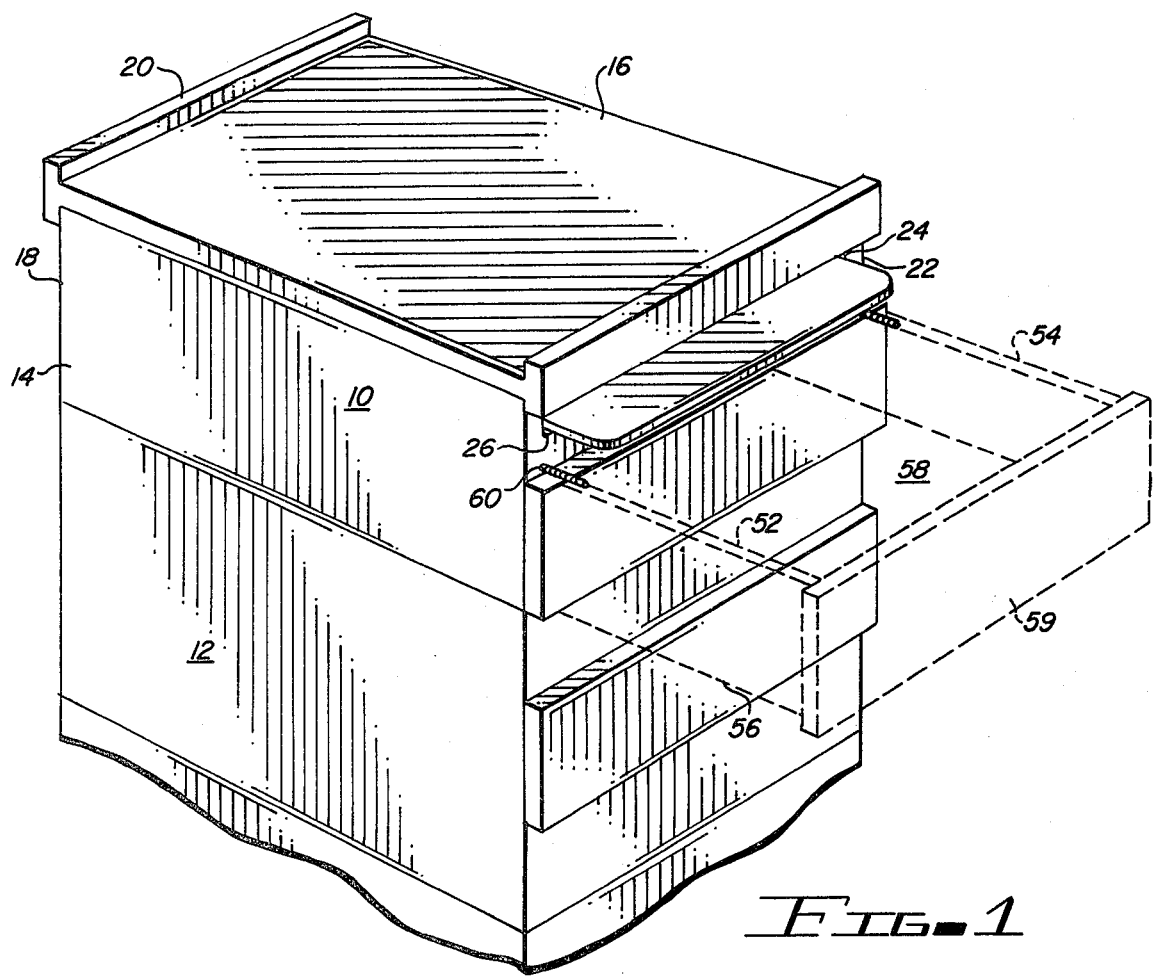
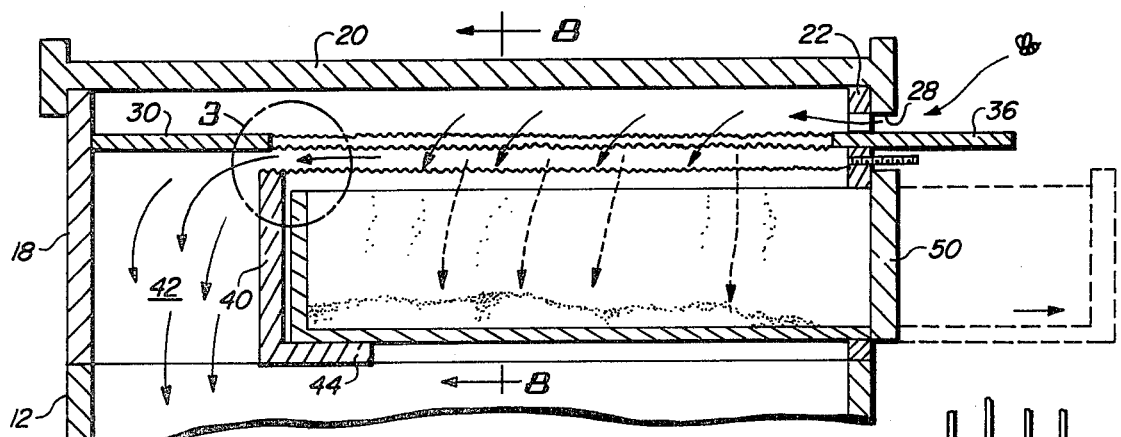
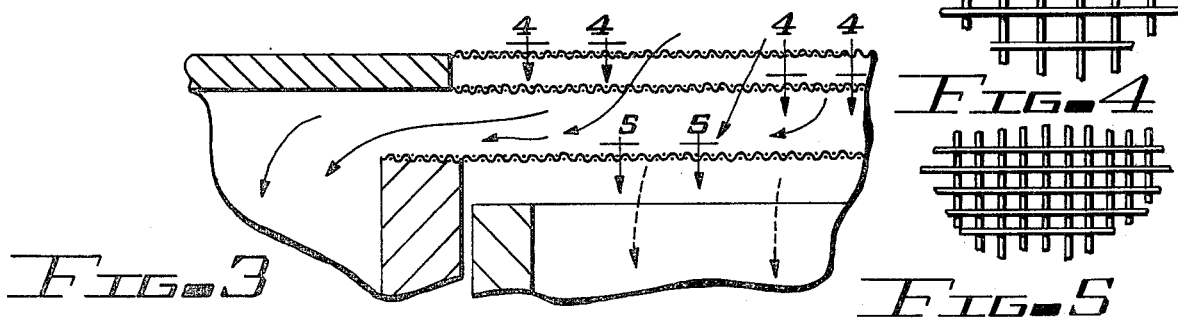

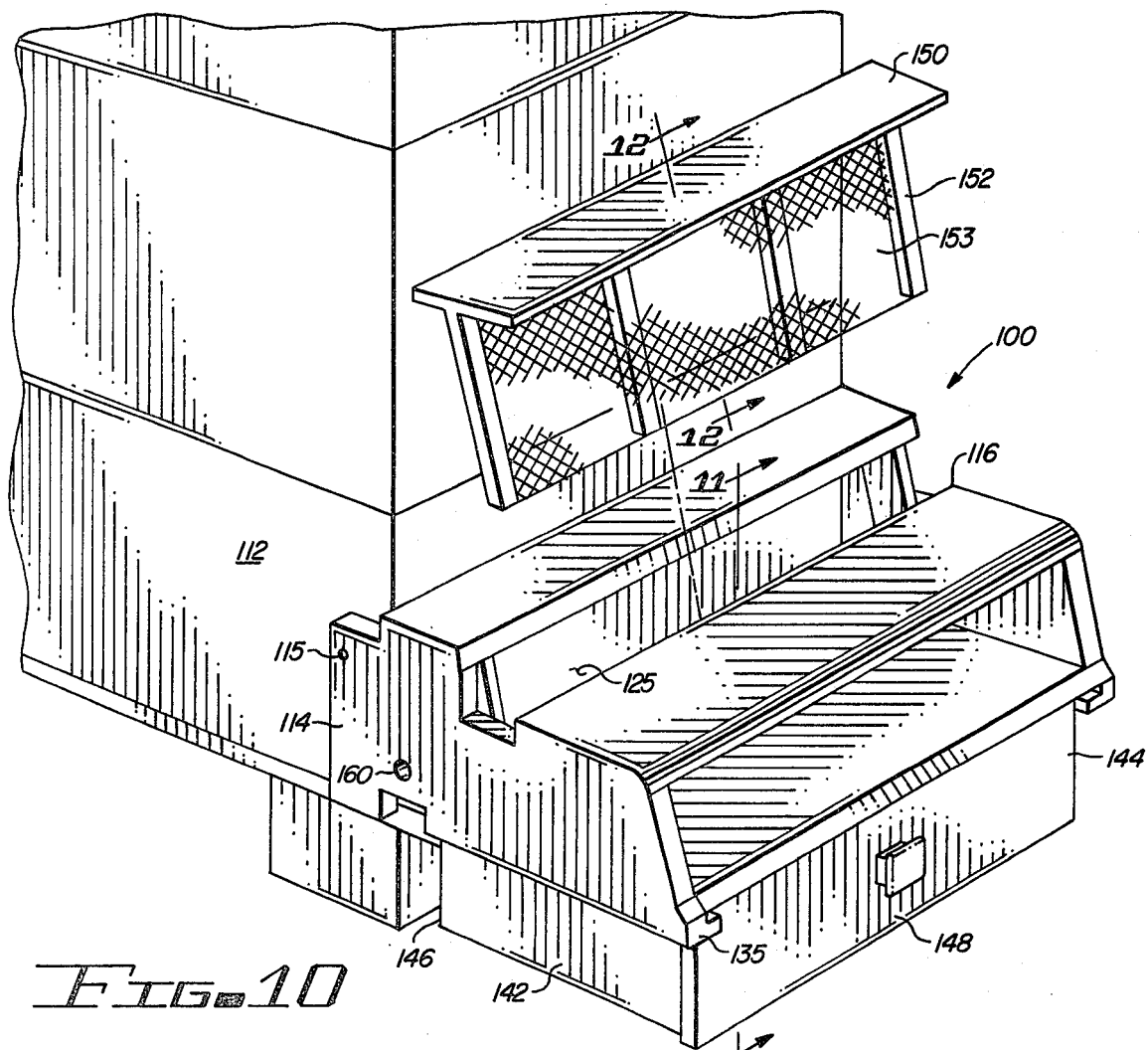
FIG-10
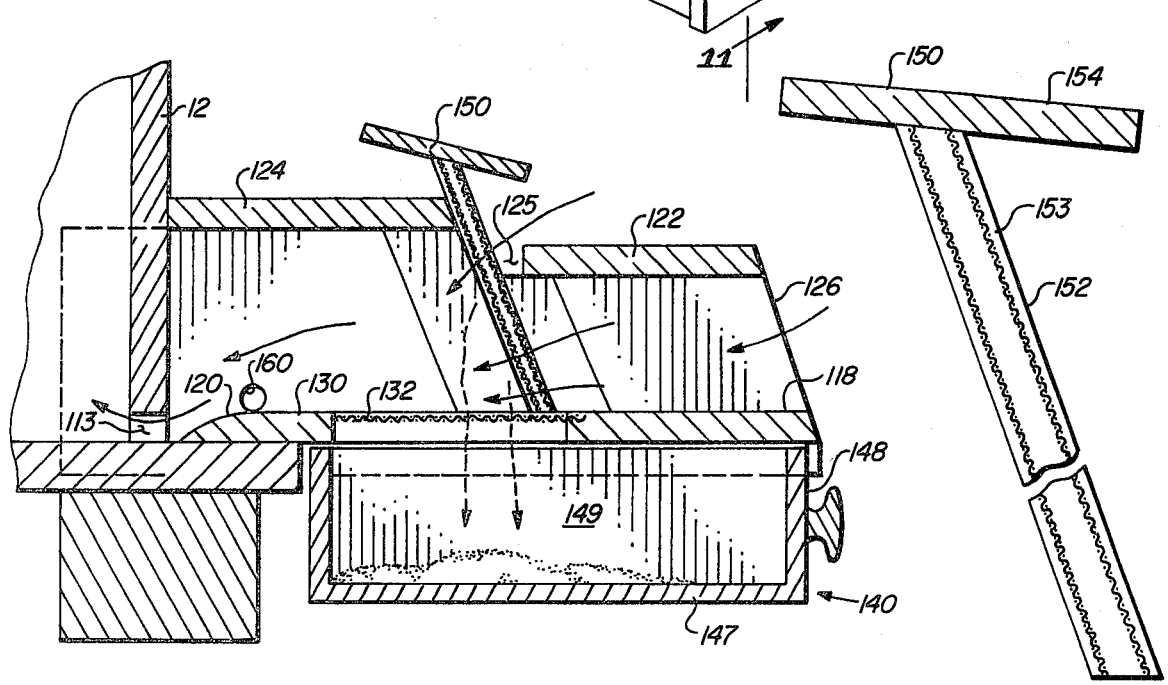
FIG-11
FIG-12

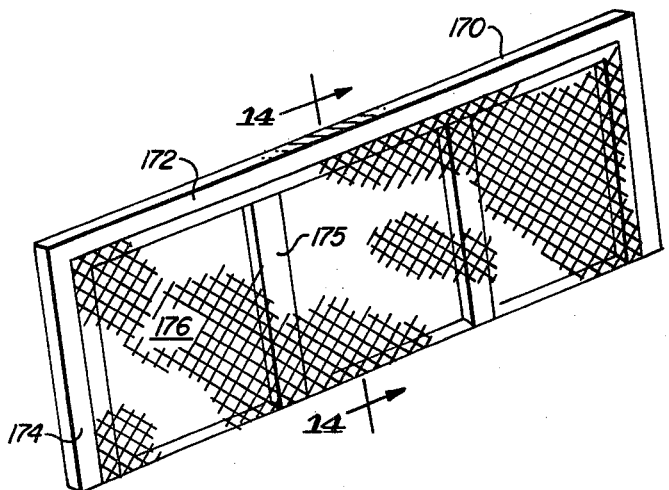
Fig. 13   Fig. 14
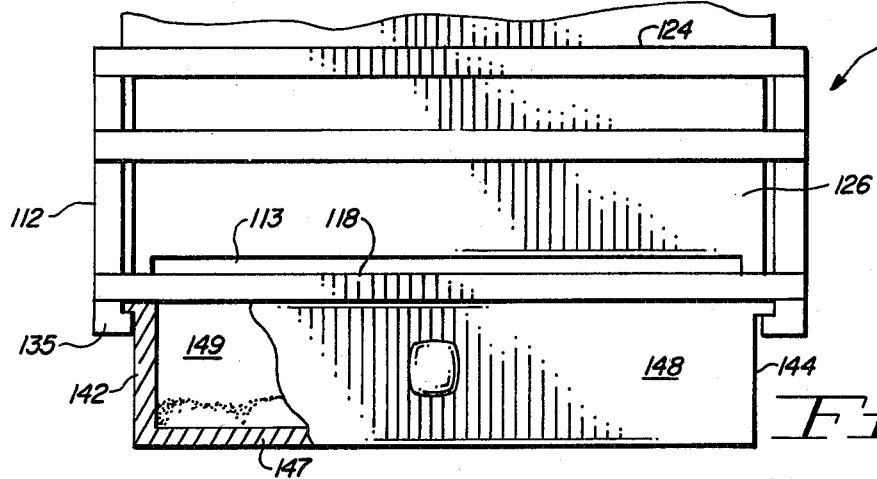
Fig. 15
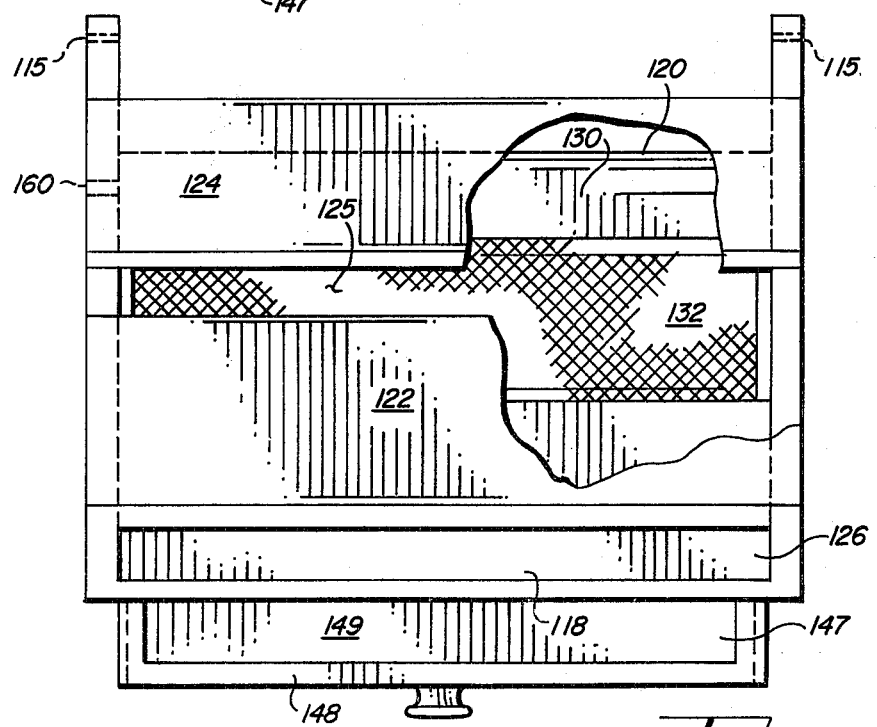
Fig. 16

COMBINATION BEE POLLEN TRAP AND HIVE CONTAINMENT APPARATUS

This is a continuation of application Ser. No. 64,123, filed Aug. 6, 1979, and now abandoned.

The present invention relates to an apparatus for attachment to a bee hive for trapping and collecting pollens from bees as the bees enter or leave the hive and for containing bees within the hive during periods when pesticides are being applied.

Pollen which is the male sex cell of flowers is also the honey bees source of fat and protein. Pollen is especially important for broodrearing since bees require an ample supply of pollen to produce young bees. Pollen also comprises an important part of the diet of both larvae and adult bees and supplies them with minerals, lipids, vitamins, proteins (amino acids).

During the period of the year when flowers are available, bees usually have a sufficient or excessive supply of pollen in the hive. The demand for pollen increases in the winter when broodrearing resumes and often pollen supplies are diminished. The beekeeper, wishing to maintain or simulate broodrearing, may have to supply honey bees with various forms of pollen such as pellets, pollen or pollen supplements.

Similarly, it has been found that pollen is of benefit in the diet of humans. As mentioned above, pollen contains essential minerals, vitamins and proteins and can be an important food supplement for human beings.

The collection of pollen either for use as a human food supplement or for bee raising, is generally accomplished by a device called a pollen trap which consists primarily of a screen and collecting container. When the trap is in position on a hive, bees entering or leaving the hive must pass through a screen or grid which is dimensioned to loosen pollen from the bee passing through the screen. The hind legs of worker bees are especially adapted for collecting and carrying pollen and some additional pollen adheres to the bee's body. A typical pollen trap of the type conventionally used by beekeepers is illustrated on page 50 of the publication "The Beekeeper's Handbook" by Summataro and Avitabile, Copyright 1978.

An improved pollen trap of the general type is also shown in the U.S. Pat. No. 3,995,338. In this patent a pollen collecting and trash removal apparatus for use on bee colonies is shown having a double screen grid with offset squares. Bees entering the hive from the field are forced to twist through the double-screen grid to lose the pollen pellets into a pollen drawer. Bees leaving the hive with trash are forced to drop it when they have to crawl through a screen-grid without off-set squares, the trash dropping into a separate trash drawer.

One problem of great concern to beekeepers is the use of pesticides in modern agriculture. Since the discovery of DDT in the middle 1940's, pesticides such as chlorinated hydrocarbons, phosphates and carbamates have caused substantial losses in bee colonies in recent years. Some approaches to the problem have been to attempt to use non-toxic chemicals, such as pheromones, which are highly selective and thus do not have any adverse affect on the bees. Other approaches have been for agricultural personnel and biologists to attempt to use pesticides which are of a reduced toxicity or which contain some type of repellant making the sprayed fields unattractive to the bees. These approaches have not been entirely satisfactory.

Accordingly, the present invention relates to a bee pollen trap which serves to remove and collect pollen from the bees as they leave and enter the trap and also provides the beekeeper means for containing bees within the hive during pesticide spraying periods to reduce the possibility of pesticide damage to the bee colony. Briefly, the present invention provides a trap assembly having a frame which may be secured placed at the top of the hive body or attached to the exterior of the hive at the bottom entrance defining a pathway for the bees. A removable restriction or collection grid having a wire mesh screen may be inserted in the pathway so the bees must pass through the screen as they leave or enter the hive. The bee pollen is caused to be dislodged from the bees legs and body and fall into a subjacent drawer for collection of pollen. The collection screen or grid can be removed or partially removed to give the bees free access to the hive when desired as, for example, during periods when flowers are not available in abundance. A removable containment screen may be attached to the frame to prevent bees from leaving the hive during active periods of crop spraying. The mesh size of the containment screen is smaller than the bees. The screen, however, allows ventilation to the hive and permits the beekeeper to feed the bees, as for example with sugar water, through the screen during containment periods.

The above and other objects and advantages of the present invention will become more apparent from the following description, claims and drawings in which:

FIG. 1 is a perspective view of a portion of a bee hive with the pollen trap of the present invention positioned on the top of the hive;

FIG. 2 is a longitudinal sectional view through the trap and the upper portion of the hive;

FIG. 3 is an enlarged detailed view of the portion of the trap as indicated in FIG. 2;

FIG. 4 is a detail view of a portion of the grid of the collection screen taken along lines 4—4 of FIG. 2;

FIG. 5 is a partial detail view taken along lines 5—5 of FIG. 2 showing the wire mesh covering the pollen drawer;

FIG. 10 is a perspective view of an alternate embodiment of the present invention showing the apparatus secured at the bottom entrance to the hive;

FIG. 11 is a sectional view taken along lines 11—11 of FIG. 10;

FIG. 12 is a sectional view taken along lines 12—12 of FIG. 10;

FIG. 13 is a perspective view of the containment screen;

FIG. 14 is a sectional view taken along lines 14—14 of FIG. 13;

FIG. 15 is a partial front view, partly broken away, of the trap shown in FIG. 10; and FIG. 16 is a top view, partly broken away, showing the trap illustrated in FIG. 10.

Figure 6:
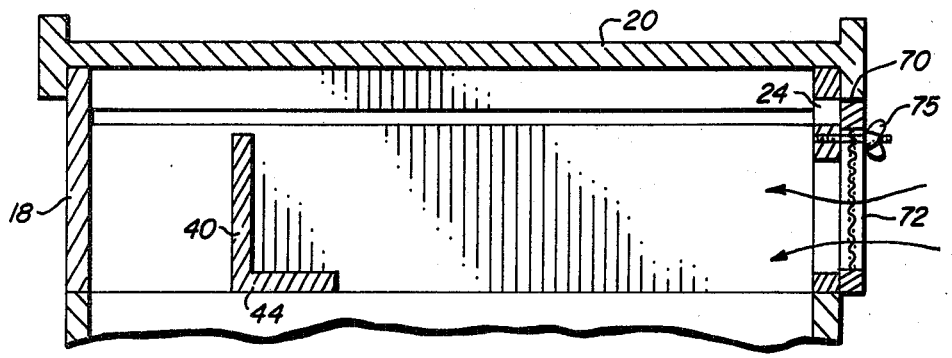
FIG. 6 is a longitudinal sectional view of the trap of the present invention showing the containment screen in place.

Turning now to the drawings, particularly FIGS. 1 through 9, a preferred form of the present invention is shown generally illustrated by the numeral 10. The combined pollen trap and confinement apparatus of the present invention is shown positioned in place on the top of one of the components of the hive body 12 which, for example, may either be a shallow super or a brook chamber. The outer dimensions of the components of modern hives are standard, being originally established by L. L. Langstroth, having a width of 14⅝ inches and a length of 18¼ inches. The outer dimensions of the apparatus 10 conform to these dimensions so the apparatus can be positioned on the open top of hive body 12. Apparatus 10 is generally rectangular having a frame comprising opposite side walls 14 and 16 and a rear wall 18. The top of the frame is open and may be enclosed by a conventional outside cover 20 which is removed from the top of the super or brood chamber 12 when the apparatus 10 is positioned thereon.

Figure 9:
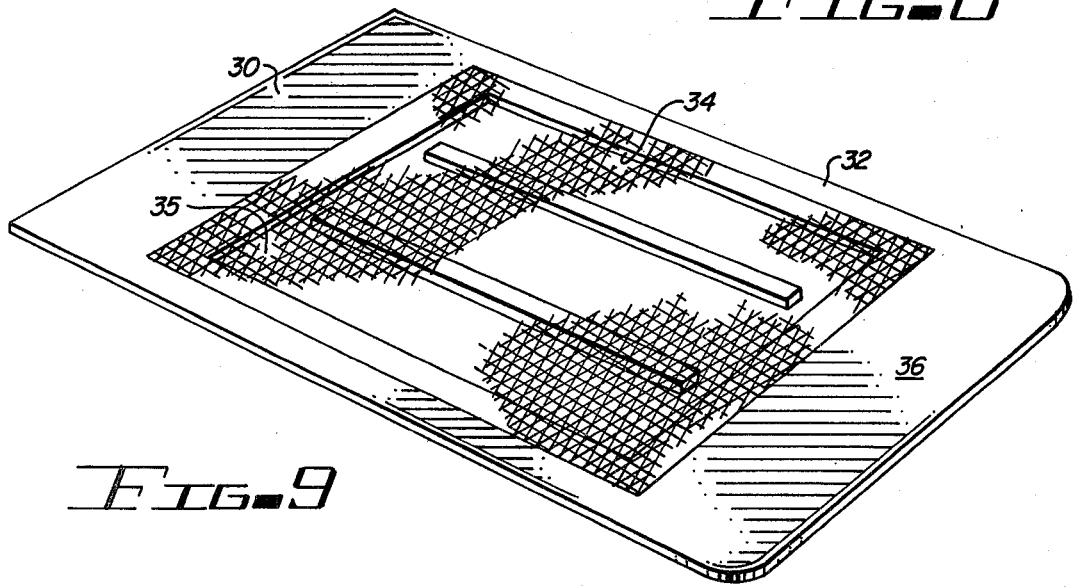
FIG. 9 is a perspective view of the collection grid panel.

A bar 22 extends across the front of the trap assembly 10 between opposite side walls 14 and 16. Bar 22 defines an opening or entrance slot 24 as best seen in FIG. 2. A pair of guide slots 26 and 28 extend longitudinally along the inside of side walls 14 and 16, respectively. Guide slots 26 and 28 are at an elevation corresponding to opening 24 and extend longitudinally rearwardly along the opposite side walls. Collection grid panel 30 is slidable along opposite slots 26 and 28. Panel 30 is best shown in FIG. 9 and includes a generally rectangular frame member 32 having a central cut-out 34. A grid 35 of wire mesh or screen such as No. 5 mesh wire extends over the cut-out 34 and is secured to the panel frame 32 about the periphery of cut-out 34 by staples or other appropriate fastening means. With the collection panel 30 in position as shown in FIG. 2, the forward edge of the frame 32 defines a landing deck 36 which extends laterally beyond the entrance slot 24 to provide a surface for the bees when entering or leaving the hive.

A vertical partition 40 extends transversely between side walls 14 and 16 positioned forwardly of rear wall 18 defining an entrance passageway 42 therebetween into the subjacent hive 12. The upper edge of partition 40 terminates at a location below the bottom surface of horizontal collection panel 30. A bottom guide 44 extends horizontally between side walls 14 and 16 to support pollen drawer 50. A fine mesh screen 45 extends horizontally between the opposite side walls 14 and 16 extending from transverse bar 22 to partition 40. Screen 45, as best seen in FIG. 5, is of a mesh or grid spacing so as to prevent bees from passing therethrough.

Drawer 50 is generally rectangular having opposite sidewalks 52 and 54, rear wall 56 and floor or bottom 58. A front panel 59 engages the front bar 22 when the drawer is in a closed position. Bottom 58 is slidable along guide 44.

The various components of the apparatus of the present invention can be fabricated from any convenient material such as plastic, metal or wood. It is preferred that the pollen drawer 50 be constructed of wood such as cedar which serves to repel certain insects which will infest the hive and honeycomb and, if present in sufficient number, destroy it, such as the wax moth or the bee moth.

Figure 7:
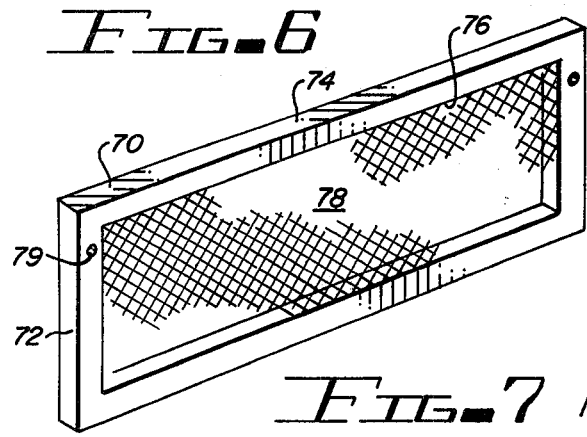
FIG. 7 is a perspective view of the containment screen.
Figure 8:
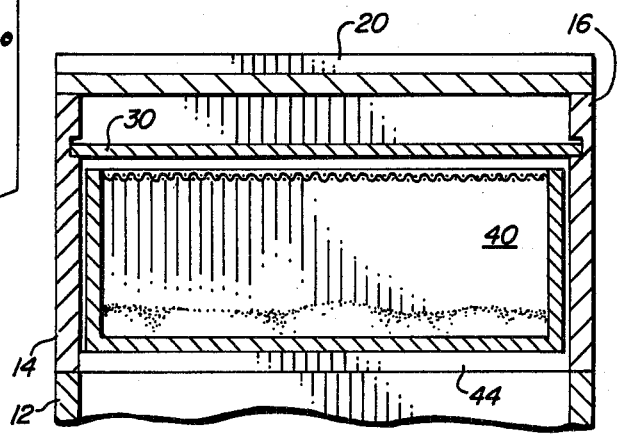
FIG. 8 is a sectional view taken along lines 8—8 of FIG. 2.

Mounting means shown as a pair of horizontally extending studs 60 are located adjacent the opposite edges of transverse frame bar 22. Mounting means 60 are for securement of the containment screen 70 which is best illustrated in FIG. 7. The containment screen 70 has a generally rectangular frame having opposite side vertical members 72 and opposite horizontal frame members 74 which define a central opening 76 which is covered by a wire mesh or screen 78. The grid spacing of wire mesh 78 is such that bees cannot pass through the screen but the flow of ventilation air is not impeded. Holes 79 are located on side members 72 adapted to align with studs 60. The confinement screen 70 is positioned on the frame when collection grid 30 is removed to confine bees within the hive as will be explained. This is best illustrated in FIG. 6. It will be observed that vertical dimension of containment screen 70 is selected to block opening 24 with the screen in place. Wing nuts 75 are threaded on the ends of stud 60 to secure the containment screen in position.

The present invention will be more fully appreciated from the following description of use. The apparatus 10 is positioned on a conventional hive 12 by prying the existing outer cover 20 loose from the top of the hive with a hive tool or other instrument. The apparatus 10 is dimensioned to correspond to the exterior dimensions of the hive and can be placed thereon without the requirement of any fasteners as the bees will seal the apparatus to the hive by applying propolis. The outer hive cover can be placed on the top of the apparatus 10. As mentioned above, pollen is the male sex cell of flowers and adheres primarily to the hind legs and the body of the bees. Bees entering or leaving the hive must follow a prescribed path through the apparatus. For example, a bee entering the hive 12 carrying pollen will approach landing deck 36 and enter the hive at opening 24. The bee will then pass through the horizontal screen 35 of collection panel 30. The passage of the bee through screen 35 will cause the pollen pellets to be loosened from the bees and the pollen will fall downwardly into the subjacent pollen collection drawer 50 through the lower horizontal screen 45. The lower horizontal screen 45 is of sufficiently small mesh size to prevent bees from entering into drawer 50. The bees must then follow the horizontal tunnel between screen 45 and panel 30 which opens into vertical passageway 42 and into the subjacent main hive 12. When a quantity of pollen has collected in the pollen drawer 50, the drawer can be opened by sliding the drawer outwardly and the collected pollen removed.

During periods when potentially harmful pesticides are being applied in fields in the area where bees within the hive forage, the pollen drawer 50 and collection panel 30 are removed and the containment screen secured in place. This generally will be done early in the morning when, for example, aerial spraying of cotton with pesticides takes place. Generally these pesticides are most harmful to bees when first applied and still moist. The beekeeper confines the bees within the hive for a few hours, as for example, during early morning hours when sprays are being applied. The containment panel is positioned in place across the front of the trap and fastened in place by wing nuts 75. The screen in the confinement panel is of sufficiently small mesh to prohibit the bees from exiting from the hive. However, ventilating air may pass through the screen 78 and in order to maintain the colony in a tranquil condition. Food in the form of sugar water may be sprayed or otherwise introduced into the hive 12 through the screen section 78 to further pacify the colony.

When the danger of the pesticide has diminished, as for example, after several hours and the spray is dried, the confinement screen 70 can be removed from the front of the hive and the pollen collection drawer 50 and the collection panel 30 replaced.

During times when pollen production is low and bees are not carrying excess pollen pellets attached to their legs and bodies, the collection panel 30 can be slid forwardly allowing the bees to enter the subjacent hive 12 at the rear edge of the panel 30 without passing through the pollen collection screen 34. The entire apparatus 10 can easily be removed from a hive by simply prying it loose with an appropriate hive tool.

An alternate form of the combined trap and containment apparatus is illustrated in FIGS. 10 through 16 and is generally designated by the numeral 100 which is shown secured to a hive 112 at an elevation corresponding to the bottom opening 113 to the hive. The apparatus 100 includes opposite side panels 114 and 116 which are horizontally spaced apart a distance corresponding to the width of the hive and secured to the hive by mechanical fasteners 115. A generally horizontal floor 118 extends transversely between side members 114 and 116. Preferably the rear edge of floor 118 is beveled at 120 to guide the bees towards entrance 113 through the hive. The top covers 122 and 124 extend horizontally between side members 114 and 116 and are vertically and horizontally spaced apart from one another defining an opening 125 therebetween. A portion of floor 118 is cut-away at 130 and is covered by screen 132. Screen 132 is of fine mesh or grid so as to prevent the bees from passing therethrough.

The bottom edges of side panels 114 and 116 form flanges 135 which support a slidable pollen drawer 140. Drawer 140 has opposite side walls 142 and 144, rear wall 146, bottom wall 147 and front panel 148 forming an enclosure or receptacle 149 for receipt of deposited pollen.

Pollen collection screen 150, as best shown in FIGS. 10 and 12, comprises a frame of a plurality of horizontally spaced apart legs 152. A grid or screen 153 extends across the opposite faces of legs 152 and is of a size selected to cause pollen to be loosened from the bees as they pass through the screen openings. A generally horizontal cover 154 is secured to the top of legs 152. The purpose of cover 154 is to shield opening 125 from rain, wind, dust and other elements.

It will be apparent that bees can enter into apparatus 100 either at opening 125 or opening 126 following a generally horizontal path through the apparatus and across the pollen collection screen 150. As the bees pass through the screen 150, pollen adhering to the body and legs of the bees is loosened and is caused to fall through generally horizontal screen 132 into subjacent pollen collection drawer 140. Bees then proceed into the hive 112 through the lower opening 113. The bevel or taper 120 at the rear edge of lower platform or deck 118 helps to guide the bees to the hive. An opening 160 may be provided inside wall 114 to permit exit and entry of the larger drone bees.

When it is desired to confine bees within the hive 112, as for example, during spraying periods, collection screen 150 is removed and containment screen 170 is inserted. Containment screen 170 is shown in FIGS. 13 and 14 and comprises a generally rectangular frame having a top member 172 and opposite end members 174. Intermediate frame members 175 may also depend from horizontal frame member 172 for reinforcement and stiffening. A screen 176 of a selected mesh spacing to prohibit the passage of bees covers the frame. It will be apparent that when containment screen 170 is inserted within opening 125, the passageway 126 into the hive opening 113 is effectively blocked-off and the colony of bees within the hive are contained therein. Screen 176 permits adequate ventilation to the hive and also permits the beekeeper to feed the bees a food supplement such as sugar or sugar water.

During periods when flowers are not available or not available in abundance, collection screen 150 may be removed and bees will have direct access to entrance 113 through passage 118.

It will be seen that the combination pollen trap and confinement apparatus of the present invention can be conveniently manufactured and is easy to place or remove from the hive by a single beekeeper. The pollen collection screen can be easily removed in heavy honey flow seasons if it appears more profitable to operate without the screen in place. On weak hives, the pollen screen can be removed entirely or simply a panel with a cut-out or opening inserted in the place of the pollen screen. During spraying seasons, the pollen collection screen can be removed and the finer mesh containment screen inserted at night or in the early morning to retain or confine the bees in the hive until the pesticide danger is substantially over. The relatively fine confinement screen allows the beekeeper to spray the hive with sugar water to keep the bees pacified until it is safe to remove the screen. This virtually eliminates the loss of bees during spraying season. The installation of the trap is convenient and does not anger or agitate the bees as the bee hive does not have to be broken down for installation.

It will be obvious to those skilled in the art to make various changes, alterations and modifications to the combination pollen trap and confinement apparatus described in the present application. To the extent that these changes, alterations and modifications do not depart from the spirit and scope of the appended claims, they are intended to be encompassed therein.

We claim:

1. A combination pollen trap and containment apparatus for attachment to a standard bee hive, said apparatus comprising:
    (a) an attachment frame having opposite sides, a rear wall and a front wall defining an opening therein providing an entrance passageway to the hive, said frame being dimensioned to be positionable with a standard bee hive;
    (b) pollen collection means defining apertures therein through which bees may pass and which are restricted to loosen pollen as the bees pass therethrough, said pollen collection means being selectively insertable in said entrance passageway to restrict the passage to cause the bees to pass through said apertures and being removable from said entrance passageway to permit unrestricted access to the associated hive, said apertures extending substantially from the entrance passageway rearward when said pollen collection means is inserted in said entrance passageway, and further including a deck portion extending exteriorly of said entrance in said inserted position;
    (c) a pollen collection receptacle removably positioned in said frame and removable from the frame at one of said walls, said receptacle being positioned subjacent the said pollen collection means and substantially co-extensive with said apertures to collect and receive the pollen loosened from the bees when said pollen collection means is inserted in the entrance passage of said apparatus;

(d) containment means having openings therein which permit passage of air but prohibits passage bees therethrough, said containment means being detachably securable on said frame to confine the bees in the hive while permitting ventilation of the hive via the attachment frame.

2. The apparatus of claim 1 wherein said frame has exterior dimensions generally conforming to the exterior dimensions of a hive whereby said frame may be placed on the top of said hive.

3. The apparatus of claim 1 wherein said receptacle is at least partially fabricated of cedar.

* * * * *